United States Patent [19]
Hagenson

[11] 3,876,357
[45] Apr. 8, 1975

[54] AUTOMATIC PRESS SAFETY CAGE

[75] Inventor: Leo J. Hagenson, Kenyon, Minn.

[73] Assignee: Foldcraft Company, Kenyon, Minn.

[22] Filed: Mar. 14, 1974

[21] Appl. No.: 451,164

[52] U.S. Cl. .................................. 425/151; 74/612
[51] Int. Cl. ............................................ B29c 3/00
[58] Field of Search .......... 425/151; 100/53; 74/612

[56] References Cited
UNITED STATES PATENTS

| | | | |
|---|---|---|---|
| 1,001,858 | 8/1911 | Jones | 74/612 |
| 1,256,641 | 2/1918 | Bailey et al. | 74/612 |
| 2,307,524 | 1/1943 | Malcom | 74/612 |
| 2,557,300 | 6/1951 | Lowry | 74/612 X |
| 3,783,709 | 1/1974 | Scott | 74/612 |

Primary Examiner—Robert L. Spicer, Jr.
Attorney, Agent, or Firm—Neil B. Schulte

[57] ABSTRACT

A safety cage designed to generally surround an automatic press including a parallel arm linkage connected to the cage so as to raise it above the press for the insertion of material and automatic mechanisms designed to lower the cage around the press before the press is operable.

5 Claims, 7 Drawing Figures

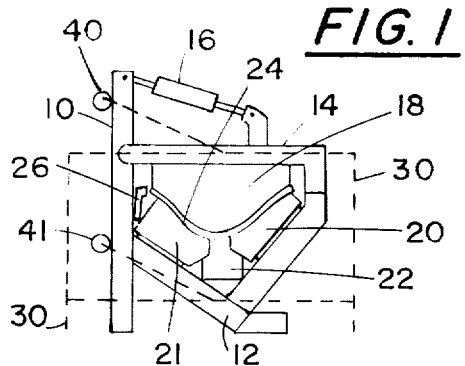
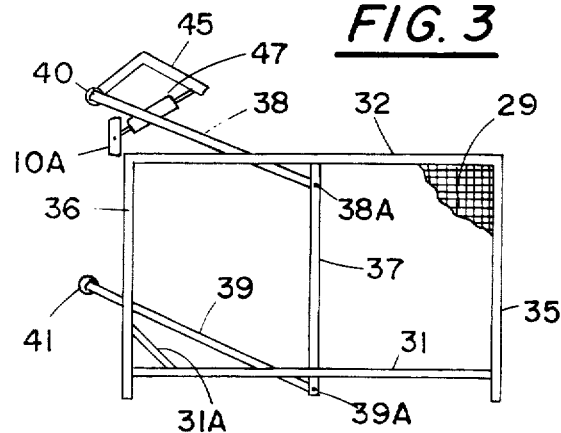
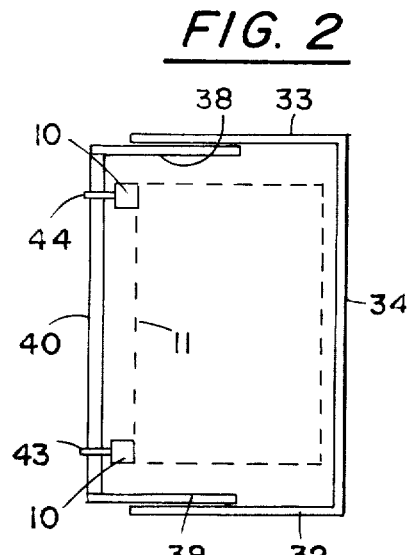
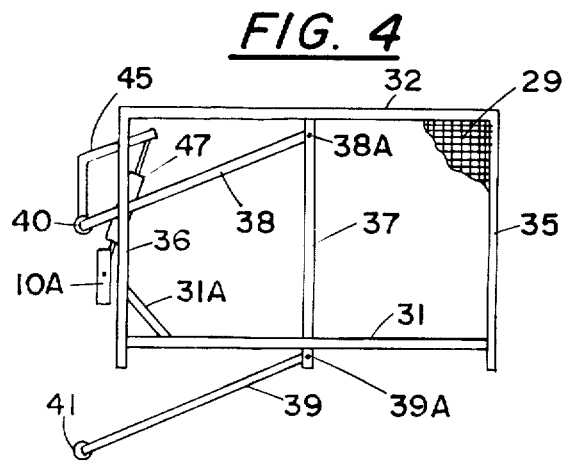
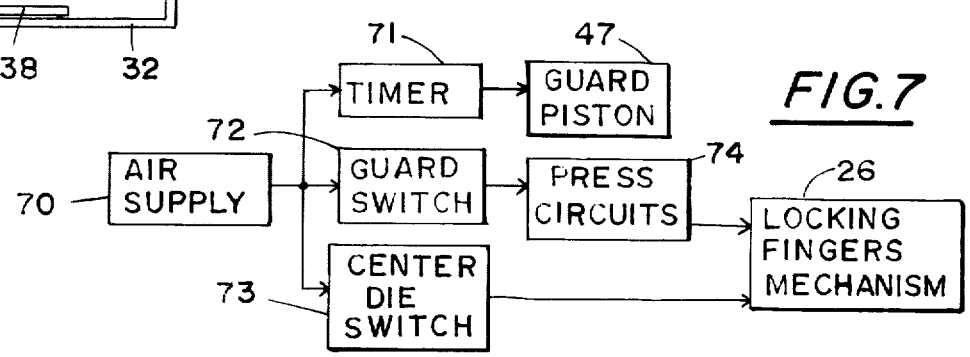
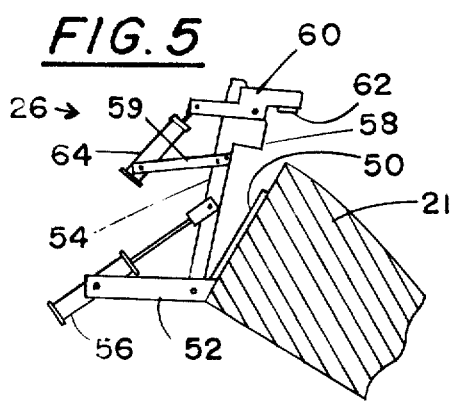
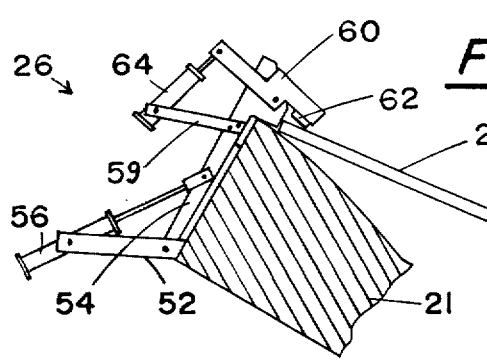

3,876,357

1

AUTOMATIC PRESS SAFETY CAGE

BACKGROUND OF THE INVENTION

The present invention constitutes an improvement to the apparatus disclosed in my U.S. Pat. No. 3,816,044 filed under Ser. No. 330,393 on Feb. 7, 1973 and entitled "Automatic Press." This prior patent discloses an automatic hot press for forming contoured laminated bench seats in which an overhead pivotable heated die swings down to form the inside of the bench against three lower dies which form the outside surface of the bench. The present invention, although having general utility with all machinery and tools, is specifically described herein with respect to this prior patented automatic press and the subject matter of that patent is incorporated into this specification by specific reference.

In the automatic press the laminate material for forming the bench seats was inserted by hand and held in place until the press has closed sufficiently to grasp the material. This was found to be hazardous in operation since the operator could possibly inadvertantly get his hands into the operating mechanism once the machine had begun its cycle. To avoid this possibility the present invention contemplates an improvement wherein a vertically movable cage is positioned around the machine and connected so as to prevent operation of the machine unless the cage is lowered around the machine thus keeping the operator away from the mechanism. Automatic air cylinder operated fingers are utilized to hold the laminate material in place alleviating the necessity of performing this operation manually. In order to insure that the cage moves up and down in a generally vertical path a parallel arm linkage is connected thereto and pivoted about suitable pivot axles mounted to the back of the machine. It may therefore be seen that it is an object of my invention to provide an improved automatic press which is safer in operation. It is an additional object of this invention to provide a movable safety gate mechanism adaptable to different types of machines to increase the safety thereof. Further objects and advantages will become apparent from the following detailed description and drawings.

BRIEF DESCRIPTION OF THE DRAWINGS

FIG. 1 is a schematic side view of the prior patented automatic press including a dashed line showing the position of the safety cage.

FIG. 2 is a top view of the safety cage itself showing the position of the automatic press therein.

FIGS. 3 and 4 show side views of the safety cage in the lowered and raised positions respectively.

FIGS. 5 and 6 are detail views of the air cylinder operated locking fingers in the unlatched and latched positions respectively.

FIG. 7 is a schematic diagram showing that the operation of the gate preceeds the remainder of the press operation.

DESCRIPTION OF THE PREFERRED EMBODIMENT

In FIG. 1 a schematic side view of the automatic press, as disclosed in my prior aforementioned patent, is shown. A full and complete description of the operation of this press may be had by reference to this prior patent and accordingly is omitted here. For the purposes of this disclosure FIG. 1 shows just the main elements of the automatic press.

The press comprises a rear main support 10 and a number of lower V-shaped supports 12 within which rest three lower dies 20, 21 and 22. A secondary frame member 14 is pivoted on support 10 by means of an air cylinder 16 so as to move an overhead die 18 down against the lower dies 20, 21 and 22. In the process the bench laminate 24 is compressed therebetween to form a bench seat. As disclosed by my previous patent the bench laminate 24, which begins as a planar piece of material, is manually inserted into the press and held in place until the press lowers a sufficient distance to engage the material. The present invention alleviates this manual operation by providing mechanical fingers 26 shown only schematically in FIG. 1, which are air operated so as to hold the laminate material in place automatically. The operation of these fingers will be described in detail with respect to FIGS. 5 and 6.

The safety cage is positioned around the press as shown by dashed line 30 in FIG. 1. The frame is pivoted from a pair of pivoting axles 40 and 41 mounted to rear support member 10. In FIG. 2 it may be seen that the cage surrounds the front and the two sides of the machine and comprises members 32 and 33 on the sides and member 34 in front. Just the top frame members of the cage are visible in FIG. 2 but corresponding bottom frame members are provided as well. The top pivot axle 40 is visible in FIG. 2 and it may be seen that the cage is pivoted on a pair of swing arms 38 about pivot axle 40. Axle 40 is carried in a pair of brackets 43 and 44 secured to the back of support members 10. Lower axle 41 is mounted to members 10 in a similar fashion to anchor a pair of swing arms 39. The automatic press or any other suitable machine tool may be positioned inside this cage in the area defined by dashed line 11.

Referring to FIGS. 3 and 4 a side view of the cage is presented in the lowered and raised positions. The lower side member 31 and the lower swing arm 39 are visible in FIG. 2. Corner posts 35 and 36 and center post 37 complete the structure of the side of the safety cage which may if desired be reinforced by a triangular gusset member 31A. Swing arms 38 and 39 are pivoted on the safety cage at points 38A and 39A and welded directly to the pivot axles 40 and 41. Swing arms 38 and 39 form a parallel linkage so as to raise the cage more or less vertically. The cage is raised and lowered by pivoting the upper pivot axle 40 with a pivot arm 45 connected to an air cylinder 47 which in turn is mounted to portion 10A of vertical support 10. The entire cage formed from the various members in the preferred embodiment is covered by suitable screening 29 to prevent the operator from passing any portion of his body through the cage into the operating area of the machine. However, this screen is for the most part omitted in the drawings to provide a better view of the apparatus of the invention. In FIG. 4 it may be seen that air cylinder 47 has been extended so as to lift up pivot arm 45, rotate pivot axle 40, and rotate swing arm 38 so as to raise the cage structure to a position above the automatic press.

It should be noted that the structure of the side of the safety cage as shown in FIGS. 3 and 4 is reproduced on the opposite non-visible end as a substantial mirror image of the arrangement shown.

In FIGS. 5 and 6 a locking finger mechanism 26 is disclosed for holding the laminate material in the press during the initial compression stages as a substitute for the manual operation. The entire locking mechanism is referred to by the numeral 26 in FIGS. 5 and 6. The mechanism comprises a mounting member 50 which may be secured by screws or any other suitable means to the edge of the lower die 21 as shown in FIGS. 5 and 6. Welded to member 50 and extending out therefrom is at least one member 52 upon which is pivoted a member 54 having a step or extension 58 thereon to fit over the edge of the lower die 21. An air cylinder 56 mounted on member 52 and connected to pivoting member 54 is extendible to move member 54 and step 58 into the position shown in FIG. 6 against which the laminate material 24 rests. In the preferred embodiment as many as four of these locking finger mechanisms 26 may be used along the edge of lower die 21 to provide a series of edges against which the laminate material 24 can be placed.

Additional support members 59 extend out from pivoting member 54 to carry another air cylinder 64 which operates against a pivoting finger 60 mounted on the end of member 54. When air cylinder 64 is extended pivot member 60 moves a rubber gripping tab 62 down against the top of laminate material 24 as shown in FIG. 6. This holds the laminate material 24 tightly in place while the press operation is initiated. The first step is the lowering of the safety gate as described earlier followed by the operation of the remainder of the press as described in the above mentioned former patent.

In FIG. 7 a brief schematic diagram is shown wherein air from an air supply is directed through a timer 71 to operate guard piston 47. Timer 71 is similar to the timer described in detail in the aforementioned patent. The timer 71 simply moves the guard piston 47 so as to lower the safety cage into position for a predetermined time during which the press operates. The operation of the press circuits 74 themselves are initiated by means of a guard switch 72 which can be any conventional electrical or mechanical switch connected to any portion of the safety gate in a manner well known to those skilled in the art so as to initiate operation of the press circuits 74 in response to the safety cage reaching its lowered position as shown in FIG. 3. As the press circuits begin air is delivered to pistons 56 and 64 to activate the locking finger mechanisms 26 just before the pivoting member 14 begins to be lowered by cylinder 16. As described in the above mentioned patent when press circuits 74 begin their cycle the upper die 18 begins to lower into position coming first into contact with the center die 22. Movement of this center die is sensed by a center die switch 73 which again may be any electro-mechanical valve or switch well known to those skilled in the art. This switch operates to unlock the locking mechanism 26. Thus, when the final closed position of the press is reached the locking mechanisms 26 will be withdrawn so as not to be caught between lower die 21 and upper die 18. It may therefore be seen that my invention includes several additional improvements to make the operation of the aforementioned automatic press or for that matter any other automatic tool much safer.

I claim:

1. A safety cage for a bench forming automatic press having a main frame, an overhead pivoting die on said frame to form the inside of the bench and a plurality of lower dies to form the outside of the bench said safety cage comprising a peripheral frame generally surrounding the hazardous parts of the press, a protection screen on said frame, a pair of generally parallel pivot members on each side of the press extending from pivot axles mounted on said main frame to said peripheral frame so as to allow generally vertical movement of said peripheral frame, and means for moving said frame vertically with respect to the press.

2. The apparatus of claim 1 in which said means for moving comprises a lever arm connected to at least one of said pivot axles and an air cylinder between the main frame and the lever arm, the extension of said air cylinder operable to move the lever arm.

3. The apparatus of claim 2 including air cylinder operated locking fingers mounted on one of said lower dies operable to lock the bench in position between the lower dies and overhead die.

4. The apparatus of claim 3 in which said locking fingers are pivotable into position between the lower dies and the overhead die and include a grabbing member pivoted thereon to hold the bench against the lower die.

5. The apparatus of claim 4 including switch means sensitive to the movement of the lower die and connected to pivot the locking fingers out from between the lower dies and the overhead die just before they come together.

* * * * *